US006921019B2

(12) United States Patent
Cheng

(10) Patent No.: US 6,921,019 B2
(45) Date of Patent: Jul. 26, 2005

(54) MEMORY CARD READER

(75) Inventor: Chen-Hsing Cheng, Taipei (TW)

(73) Assignee: BENQ Corporation, Taoyuan (TW)

( * ) Notice: Subject to any disclaimer, the term of this patent is extended or adjusted under 35 U.S.C. 154(b) by 29 days.

(21) Appl. No.: 10/747,828

(22) Filed: Dec. 29, 2003

(65) Prior Publication Data

US 2004/0140358 A1 Jul. 22, 2004

(30) Foreign Application Priority Data

Jan. 10, 2003 (TW) ........................................ 92100489 A

(51) Int. Cl.$^7$ .............................................. G06K 7/00
(52) U.S. Cl. ...................................... 235/453; 235/486
(58) Field of Search ................................ 235/439, 441, 235/453, 486; 439/151, 638; 361/752, 737

(56) References Cited

U.S. PATENT DOCUMENTS 5,750,973 A * 5/1998 Kaufman et al. ........... 235/441
6,402,558 B1 * 6/2002 Hung-Ju et al. ............ 439/638
6,738,259 B2 * 5/2004 Le et al. ..................... 361/737

* cited by examiner

*Primary Examiner*—Daniel Stcyr
*Assistant Examiner*—April Taylor
(74) *Attorney, Agent, or Firm*—Quintero Law Office

(57) ABSTRACT

A memory card reader. The memory card reader includes a housing and a device. The device is disposed in the housing for accepting different types of memory cards. The device includes a body, a first engaging plate, a second engaging plate, and a resilient plate. The body defines an accommodation for accepting different types of memory cards. The first engaging plate fastens to the body and has a release post. The second engaging plate selectively connects to the first engaging plate in a first position or a second position. The second engaging plate defines a slot in which the release post is contained and moves therein. The resilient plate contacts and exerts pressure on the body so that the first engaging plate fastened to the body is pushed toward the second engaging plate and connects thereto.

8 Claims, 4 Drawing Sheets

MEMORY CARD READER

BACKGROUND OF THE INVENTION

1. Field of the Invention

The present invention relates in general to a memory card reader and in particular to a device in the memory card reader to accept different types of memory cards.

2. Description of the Prior Art

Currently, flash memory cards are widely used in various electronic devices. The use of memory cards has become widespread and the number of different types of memory cards has increased. Different electronic devices use different types of memory cards, hence a multi-function memory card reader is called for. Although, electronic devices typically connect and transfer data to a computer via a Universal Serial Bus (USB) connection, this transfer method is limited by low bandwidth and results in slow data transfer. When advanced electronic devices and large capacity memory cards are used, the amount of data transferred is greater. Thus, it is expeditious to remove the memory card from the electronic device, and insert it directly in a memory card reader to read and transfer data to a computer.

Some memory cards readers, however, are equipped with only one slot, and accept only one type of memory card. When a memory card of a different type is inserted, it will protrude from the reader. Other memory card readers are equipped with several different size slots for accepting different sizes and types of memory cards. Both designs mentioned above increase the size of the reader.

Moreover, other types of electronic devices which accept several types of memory cards share the same drawbacks as those mentioned above. Although, the overall size of the device is reduced, the memory card still protrudes from the electronic device, and the exposed portion causes the electronic device to be unwieldy and susceptible to accidental damage.

SUMMARY OF THE INVENTION

An object of the present invention is to provide a device that solves the above mentioned problem.

The device of the present invention provides one receptacle to accept different types of memory cards. The memory card can be completely inserted into the receptacle and does not protrude from the device. Thus, the design does not increase the overall size of the device.

The device of the present invention for receiving different types of memory cards includes a body, a first engaging plate, a second engaging plate, and a resilient plate. The body defines an accommodation to receive the memory card. The first engaging plate fastens to the body and has a release post. The second engaging plate selectively connects to the first engaging plate in a first position or a second position and defines a slot in which the release post moves therebetween. The resilient plate contacts and exerts pressure on the body so that the first engaging plate fastened to the body is pushed toward the second engaging plate and connects thereto.

The first engaging plate comprises a plurality of first engaging portions protruding from the first engaging plate in one direction, the second engaging plate comprising a plurality of second engaging portions protruding from the second engaging plate in a direction opposite to the first engaging portions, and the plurality of first engaging portions connect to the plurality of second engaging portions.

The plurality of second engaging portions is arranged in two rows with the slot disposed therebetween.

The resilient plate comprises a plurality of contact nodes, the plurality of contact nodes exert pressure on the body so that the first engaging plate is pushed toward the second engaging plate and connects to the second engaging plate.

Another object of the present invention is to provide a memory card reader. The reader includes a housing and a device. The device is disposed in the housing for receiving different types of memory cards. The device includes a body defining an accommodation to receive the memory card; a first engaging plate fastened to the body and having a release post; a second engaging plate selectively connected to the first engaging plate in a first position or a second position, and defining a slot in which the release post moves therebetween; and a resilient plate contacting and exerting pressure on the body so that the first engaging plate fastened to the body is pushed toward the second engaging plate and connects thereto.

The first engaging plate comprises a plurality of first engaging portions protruding from the first engaging plate in one direction, the second engaging plate comprising a plurality of second engaging portions protruding from the second engaging plate in a direction opposite to the first engaging portions, and the plurality of first engaging portions connect to the plurality of second engaging portions.

The plurality of second engaging portions is arranged in two rows with the slot disposed therebetween.

The resilient plate comprises a plurality of contact nodes, the plurality of contact nodes exert pressure on the body so that the first engaging plate is pushed toward the second engaging plate and connects to the second engaging plate.

The memory card reading device of the present invention has the following advantages. The device provides a receptacle suitable for different types of memory cards. The memory card inserted therein is totally received and does not protrude from the reader, hence the device does not increase overall size, and the electronic device is protected from damage.

DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
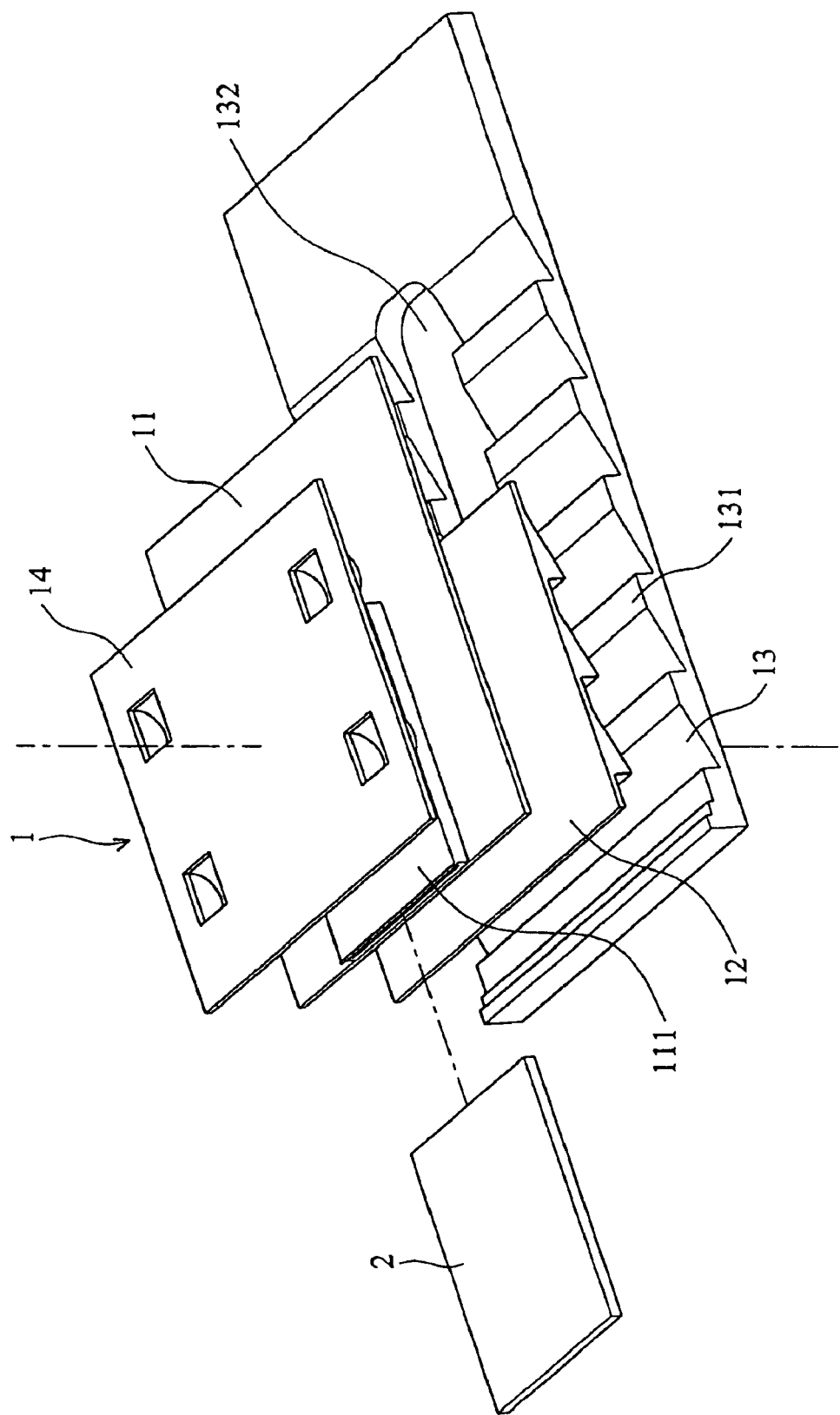
FIG. 1 is an exploded perspective diagram of a device for receiving different types of memory card in accordance with the present invention.
Figure 2:
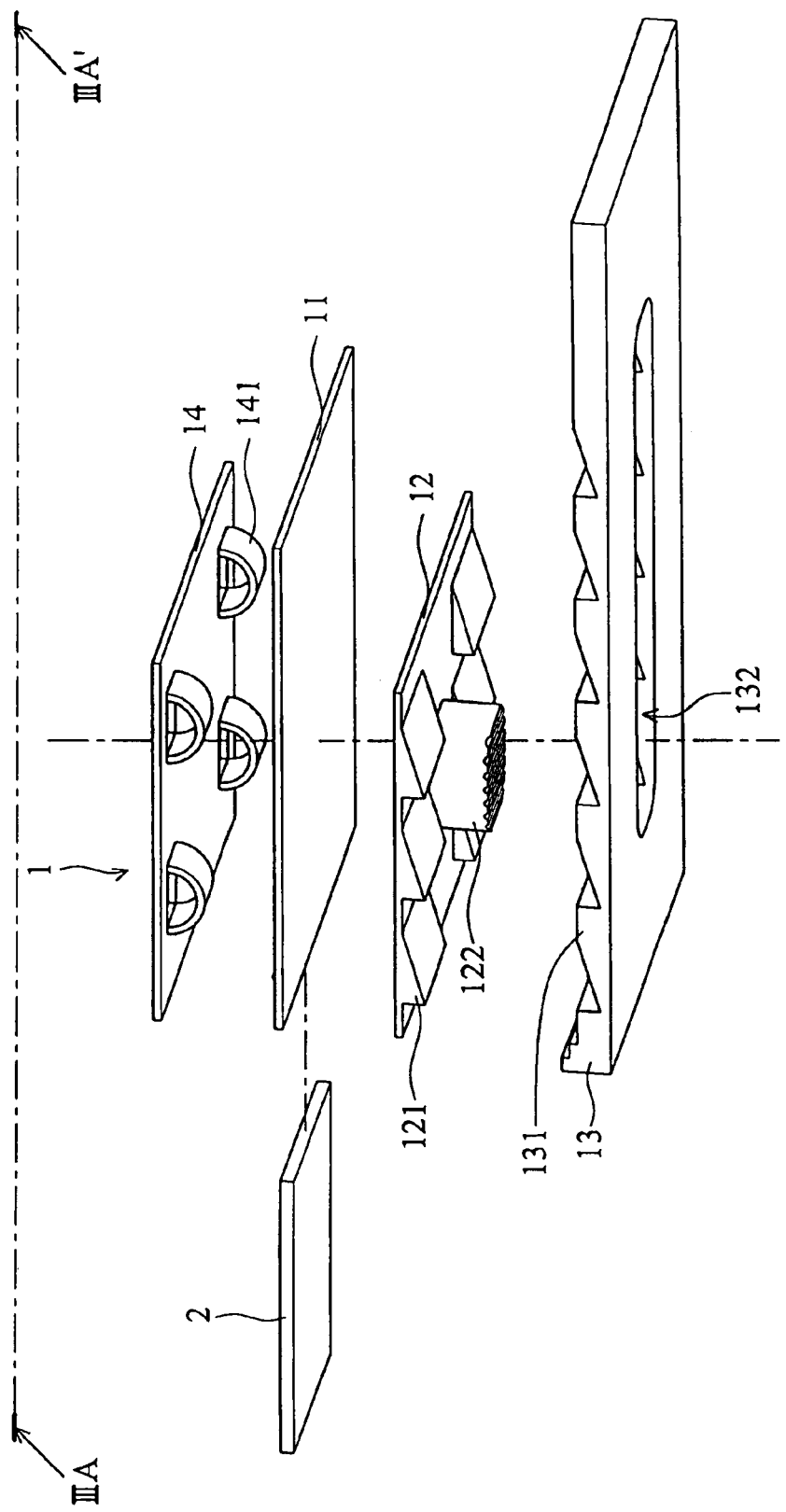
FIG. 2 is a perspective diagram of the device in accordance with the present invention.

Referring to FIGS. 1 and 2, a device of the present invention to receive different types of memory card includes body 11, a first engaging plate 12, a second engaging plate 13, and a resilient plate 14. The body 11 has an accommodation 111 to receive the memory card 2. The first engaging plate 12 is fastened to the body 11 and has a plurality of first engaging portions 121 and a release post 122. The second engaging plate 13 has a plurality of second engaging portions 131 and a slot 132. The resilient plate 14 has a plurality of contact nodes 141 exerting pressure on the body 11 so that the first engaging plate 12 fastened to the body 11 is pushed toward the second engaging plate 13. Thus, the first engaging plate 12 connects to the second engaging plate 13. Additionally, the plurality of first engaging portions 121 protrude from the first engaging plate 12 in one direction and the plurality of second engaging portions 131 protrude from the second engaging plate 13 in a direction opposite to the first engaging portions 121. The profile of the plurality of first engaging portions 121 matches the plurality of second engaging portions 131. Thus, the plurality of first engaging portions 121 engages the plurality of second engaging portions 131. Meanwhile, the release post 122 is moveable and contained in the slot 132. As shown in FIG. 2, the plurality of second engaging portions 131 are arranged in two rows with the slot 132 disposed therebetween.

Figure 3A:
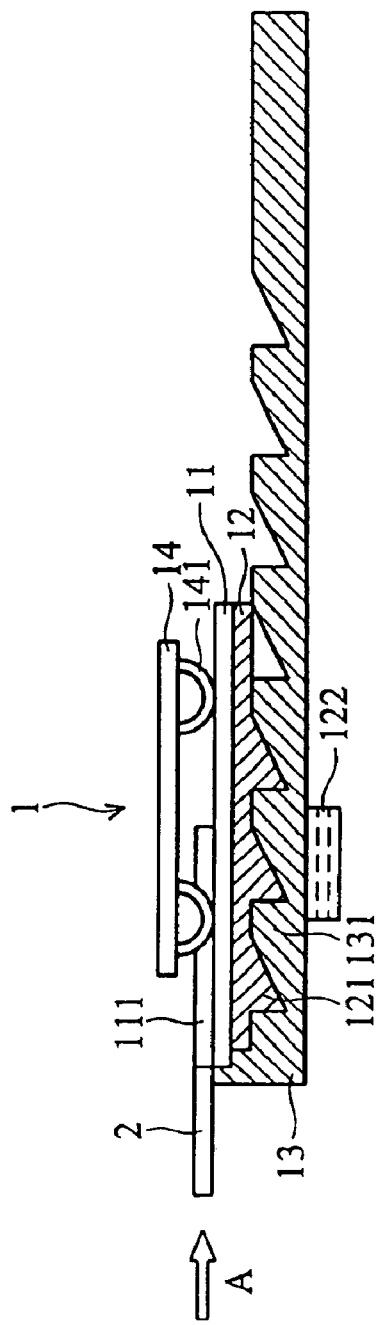
FIG. 3a is a cross section along IIIA–IIIA' line of FIG. 2 when the device is in a first position.
Figure 3B:
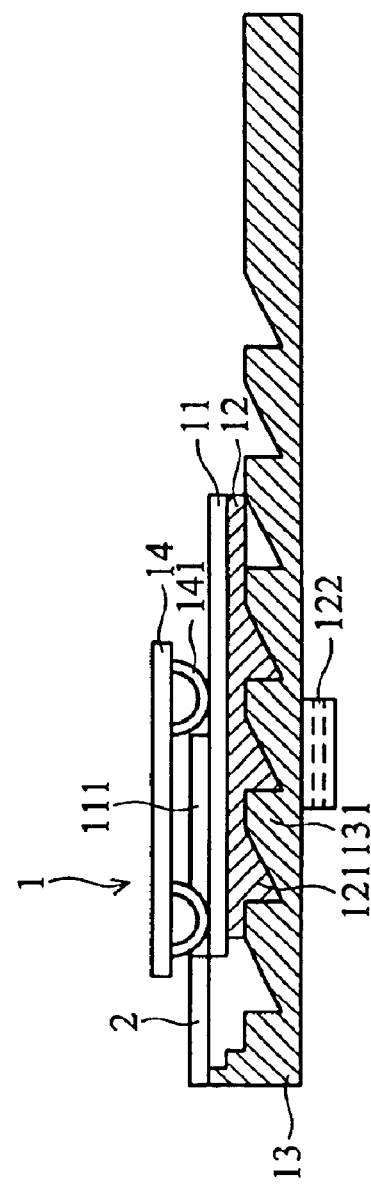
FIG. 3b is a cross section along IIIA–IIIA' line of FIG. 2 when the device is in a second position.
Figure 3C:
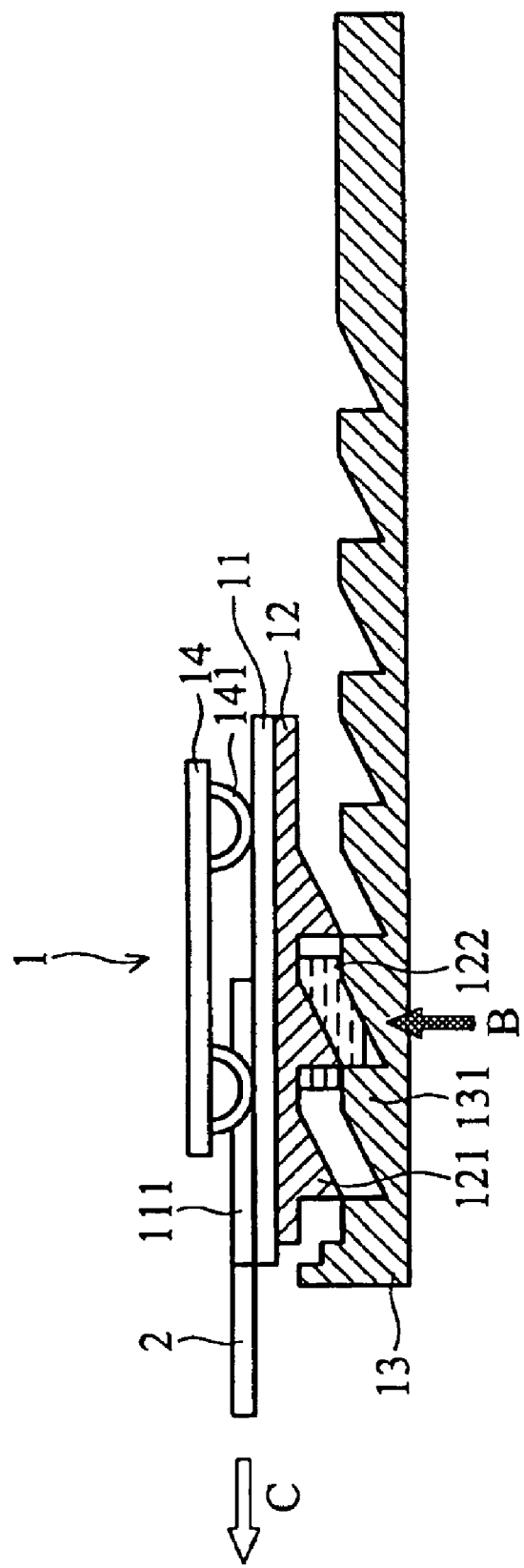
FIG. 3c is a cross section along IIIA–IIIA' line of FIG. 2 when the device is released.

Referring to FIGS. 3a, 3b, and 3c, a method of operating the memory card reader is shown. The reader includes a housing and a device 1. The device 1 is disposed in the housing for receiving different types of memory cards. In FIGS. 3a, 3b, and 3c, the reader is not shown; only a schematic view of device 1 in the reader is shown.

In FIG. 3a, a memory card 2 is inserted into the accommodation 111 of the body 11. At this point, the memory card 2 protrudes from the device 1. Meanwhile, the plurality of first engaging portions 121 connect to the plurality of second engaging portions 131 in a first position. The release post 122 of the first engaging plate 12 is movable and contained in the slot 132 of the second engaging plate 13. Due to the plurality of contact nodes 141 of the resilient plate 14 exert pressure on the body 11, the first engaging plate 12 fastened to the body 11 is pushed toward the second engaging plate 13 and connects to the second engaging plate 13. Thus, the plurality of first engaging portions 121 are connected to the plurality of second engaging portions 131. Subsequently, the memory card 2 is pushed in the direction shown by arrow A in FIG. 3a. The memory card 2 pushes the accommodation 111 so that the body 11 and the first engaging plate 12 move with the memory card 2.

Referring to FIG. 3b, after the memory card 2, the body 11, and the first engaging plate 12 have been shifted a distance, the edge of the memory card 2 is aligned with the edge of the device 1. Thus, the memory card 2 no longer protrudes from the device 1. Meanwhile, the plurality of first engaging portions 121 connect to the plurality of second engaging portions 131 in a second position. Additionally, the plurality of first engaging portions 121 protrude from the first engaging plate 12 in one direction while the plurality of second engaging portions 131 protrude from the second engaging plate 13 in the opposite direction. The profile of the plurality of first engaging portions 121 match the plurality of second engaging portions 131. Thus, when the memory card 2 is pushed, the motion between the plurality of first engaging portions 121 and the plurality of second engaging portions 131 is very smooth.

Furthermore, for different types and sizes of memory card, the body 11 and the first engaging plate 12 move different distances relative to the memory card to accept different types of memory cards.

Referring to FIG. 3c, the memory card 2 is withdrawn by lifting the release post 122 of the first engaging plate 12 through the slot 132 of the second engaging plate 13 along the arrow B by hand or implement. The body 11 and the first engaging plate 12 are even up and the plurality of contact nodes 141 of the resilient plate 14 are elastically deformed. Meanwhile, the plurality of first engaging portions 121 and the plurality of second engaging portions 131 are separated. The release post 122 then moves along arrow C as shown in FIG. 3c until the memory card 2 protrudes from the device 1. Subsequently, by releasing the pressure from the release post 122, the plurality of first engaging portions 121 and the plurality of second engaging portions 131 return to the first position as shown in FIG. 3a and the memory card 2 may be easily withdrawn.

Furthermore, the plurality of second engaging portions 131 are arranged in two rows with the slot 132 disposed therebetween, and are easily fabricated. It is to be understood that this is an example and is not limited to the disclosed embodiments.

Additionally, the device of the present invention is suitable for any kind of electronic device requiring a memory card. The electronic device may have a housing and the device of the present invention is disposed on the electronic device to achieve the object of the present invention of accepting different types of memory card.

Therefore, the advantages of the memory card reader of the present invention include; providing one receptacle capable of accepting different types of memory cards; the memory card is completely accepted and does not protrude from the reader, hence the overall product size does not increase, and damage to the memory card and device are prevented.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A device for receiving different types of memory card, comprising:
    a body defining an accommodation to receive the memory card;
    a first engaging plate fastened to the body and having a release post;
    a second engaging plate selectively connected to the first engaging plate in a first position or a second position, and defining a slot in which the release post is moveably contained; and
    a resilient plate contacting and exerting pressure on the body so that the first engaging plate fastened to the body is pushed toward the second engaging plate and connects thereto.

2. The device as claimed in claim 1, wherein the first engaging plate comprises a plurality of first engaging portions protruding from the first engaging plate in one direction, the second engaging plate comprising a plurality of second engaging portions protruding from the second engaging plate in a direction opposite to the first engaging portions, and the plurality of first engaging portions connect to the plurality of second engaging portions.

3. The device as claimed in claim 2, wherein the plurality of second engaging portions are arranged in two rows with the slot disposed therebetween.

4. The device as claimed in claim 1, wherein the resilient plate comprises a plurality of contact nodes, the plurality of contact nodes exert pressure on the body so that the first engaging plate is pushed toward the second engaging plate and connects to the second engaging plate.

5. A memory card reader, comprising
a housing; and
a device disposed in the housing for receiving different types of memory card, comprising:
   a body defining an accommodation to receive the memory cards;
   a first engaging plate fastened to the body and having a release post;
   a second engaging plate selectively connected to the first engaging plate in a first position or a second position, and defining a slot which the release post is moveably contained therein; and
   a resilient plate contacting and exerting pressure on the body so that the first engaging plate fastened to the body is pushed toward the second engaging plate and connects thereto.

6. The memory card reader as claimed in claim 5, wherein the first engaging plate comprises a plurality of first engaging portions protruding from the first engaging plate in one direction, the second engaging plate comprising a plurality of second engaging portions protruding from the second engaging plate in a direction opposite to the first engaging portions, and the plurality of first engaging portions connect to the plurality of second engaging portions.

7. The memory card reader as claimed in claim 6, wherein the plurality of second engaging portions are arranged in two rows with the slot disposed therebetween.

8. The memory card reader as claimed in claim 5, wherein the resilient plate comprises a plurality of contact nodes, the plurality of contact nodes exert pressure on the body so that the first engaging plate is pushed toward the second engaging plate and connects to the second engaging plate.

* * * * *